United States Patent [19]

Maeda

[11] Patent Number: 5,758,509
[45] Date of Patent: Jun. 2, 1998

[54] ABSORPTION HEAT PUMP AND DESICCANT ASSISTED AIR CONDITIONING APPARATUS

[75] Inventor: Kensaku Maeda, Fujisawa, Japan

[73] Assignee: Ebara Corporation, Tokyo, Japan

[21] Appl. No.: 768,456

[22] Filed: Dec. 18, 1996

[30] Foreign Application Priority Data

Dec. 21, 1995 [JP] Japan ................... 7-333213
Dec. 21, 1995 [JP] Japan ................... 7-333234

[51] Int. Cl.⁶ .................................. F25B 15/00
[52] U.S. Cl. .......................... 62/94; 62/333; 62/335
[58] Field of Search ................ 62/335, 476, 79, 62/94, 267, 271, 331, 332, 485

[56] References Cited

U.S. PATENT DOCUMENTS

| | | | |
|---|---|---|---|
| 2,700,537 | 1/1955 | Pennington | 261/83 |
| 3,483,710 | 12/1969 | Bearint | 62/335 |
| 4,430,864 | 2/1984 | Mathiprakasam | 62/94 |
| 4,441,332 | 4/1984 | Wilkinson | 62/238.3 |
| 4,827,728 | 5/1989 | DeVault et al. | 62/79 |
| 4,887,438 | 12/1989 | Meckler | 62/271 |
| 4,905,479 | 3/1990 | Wilkinson | 62/271 |
| 4,921,515 | 5/1990 | Dao | 62/335 |
| 4,987,750 | 1/1991 | Meckler | 62/238.6 |
| 5,181,387 | 1/1993 | Meckler | 62/59 |
| 5,325,676 | 7/1994 | Meckler | 62/93 |
| 5,448,895 | 9/1995 | Coellner | 62/94 |

*Primary Examiner*—William Doerrler
*Attorney, Agent, or Firm*—Armstrong, Westerman, Hattori, McLeland & Naughton

[57] ABSTRACT

A desiccant assisted air conditioning apparatus incorporates an absorption heat pump device to produce improved operating efficiency. The heat pump device has circulation units 1 and 2, each of which includes an evaporator, an absorber, a generator and a condenser and heat exchangers provided by heat transfer pipe action. The absorber in unit 1 operates at a higher temperature than the absorber in the absorber in unit 2 so that heat transfer can occur through heat transfer pipes acting as heat exchangers between the first evaporator and the second absorber in the two units. The heat of condensation from units 1 and 2, as well as the heat of absorption from unit 1 are used to heat regeneration air for regenerating the desiccant. The heat of evaporation in unit 2 is utilized to produce chilled water for cooling the process air in the air conditioning apparatus. The use of heat enabled by the heat pump device achieves a high level of energy conservation for performing desiccant assisted air conditioning apparatus which operates at high efficiency.

12 Claims, 9 Drawing Sheets

ABSORPTION HEAT PUMP AND DESICCANT ASSISTED AIR CONDITIONING APPARATUS

BACKGROUND OF THE INVENTION

1. Field of the Invention

The present invention relates to absorption heat pumps in general, and relates in particular to an absorption heat pump utilized as a heat source in a desiccant assisted air conditioning apparatus and an air conditioning apparatus based on the heat pump device.

2. Description of the Related Art

Desiccant assisted air conditioning apparatus is well known, for example in a U.S. Pat. No. 2,700,537. The system discloses a desiccant assisted air conditioning apparatus requiring a heat source in a temperature range of 100°–150° C. for regenerating the desiccant (moisture adsorbent), and heat sources such as electric heaters and boilers are primarily utilized. In recent years, desiccants which can be regenerated at lower temperatures in a range of 60°–80° C. have been developed, enabling the use of heat sources operating at lower temperatures. FIG. 8 is a schematic representation of a typical example of such improved desiccant assisted apparatus, and FIG. 9 is a psychrometric chart showing the operation of this example apparatus. In FIG. 8, the reference numeral 101 refers to a conditioning space; 102 refers to a blower; 103 refers to a desiccant wheel; 104 refers to a sensible heat exchanger; 105 refers to a humidifier; 106 refers to a water supply pipe for the humidifier; 107–111 refer to air ducts for conditioned air flows; 130 refers to a blower for the regeneration air; 120 refers to a heat exchanger for hot water and regeneration air (hot water heat exchanger); 121 refers to a sensible heat exchanger; 122, 123 refer to hot water pipes; and 124–129 refer to air ducts for regeneration air. In FIG. 8, circled letters K–V represent the thermodynamic state of the air medium being processed to correspond to respective sites shown in FIG. 9. SA designates supply air, RA designates return air, OA designates outside air and EX designates exhaust air.

The operation of such an apparatus will be explained in the following. In FIG. 8, the ambient air from the room 101 to be conditioned (process air) is drawn through a passage 107 into a blower 102 to be pressurized and is forwarded to a desiccant wheel 103 through a passage 108. In the desiccant wheel 103, the humidity ratio of the ambient air is lowered by the removal of moisture from the ambient air to the moisture adsorbent in the desiccant wheel 103. During the process of absorption, the heat of adsorption is released into the process air which rises in temperature. The process air with a warmer temperature and a lower humidity is forwarded through the passage 109 to the sensible heat exchanger 104, and is cooled by heat exchange with outside air (regeneration air). The cooled air is forwarded to a humidifier 105 through a passage 110 to be cooled by such means as water spray or evaporative humidifier in an isenthalpic process and is returned to the conditioning room 101 through a passage 111.

The desiccant material takes in moisture during this process, and it must be regenerated. In this example, this is performed as follows. Outside air (regeneration air) OA is drawn into the blower 130 through a passage 124 to be pressurized and forwarded to the sensible heat exchanger 104, cools the process air and in the process raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a hot water heat exchanger 120 through a passage 126 so that its temperature rises to a range of 60°–80° C., and its relative humidity is lowered. The regeneration air with a lowered humidity passes through the desiccant wheel 103 to remove the moisture from the desiccant wheel. Spent air from the desiccant 103 flows through a passage 128 to enter the sensible heat exchanger 121 to preheat the regeneration air prior to regeneration, and flows through a passage 129 to be exhausted externally.

The above process can be explained with reference to the psychrometric chart shown in FIG. 9. The ambient air in room 101 to be air conditioned (air for processing: state K) is drawn into the blower 102 through the passage 107 to be pressurized, and flows through the passage 108 to reach the desiccant wheel 103 so that its humidity ratio will be lowered by the loss of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the humidifier 105 so that its temperature is lowered in an isenthalpic manner by means of water spray or evaporative humidifier (state P), and is returned through the passage 111 to the conditioning space 101.

As explained above, a difference in enthalpy $\Delta Q$ is generated between the returned air (K) and the supply air (P) which is responsible for cooling the conditioning space 101. The desiccant is regenerated as follows. Outside air (OA: state Q) is withdrawn through the passage 124 into the blower 130, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S). Regeneration air from the sensible heat exchanger 121 flows through the passage 126 to reach the hot water heat exchanger 120 and is heated by the hot water to a temperature between 60°–80° C., so that its relative humidity is lowered (state T). The regeneration air having a lowered humidity flows through the desiccant wheel 103 thereby losing its moisture (state U). Spent outgoing air from the desiccant wheel 103 flows through the passage 128 to reach the sensible heat exchanger 121 to preheat the regeneration air prior to regeneration process, and lowers its own temperature (state V) and flows into the passage 129 to be exhausted out as waste air.

The processes of regeneration of desiccant and dehumidification of the ambient air described above is repeatedly performed to provide the desiccant assisted air conditioning process. The conditioning energy efficiency of such an apparatus is given by a value of coefficient of performance (COP) which is obtained by dividing the enthalpy difference $\Delta Q$ (a measure of cooling effect) shown in FIG. 9 by regeneration heat $\Delta H$ (i.e., COP=$\Delta Q/\Delta H$). However, in the conventional desiccant assisted air conditioning apparatus, even though the temperature of the hot water utilizable for heating the regeneration air has been lowered compared with the earlier apparatuss, the COP values for conventional desiccant assisted air conditioning apparatuss is still lower than those of air conditioning apparatuss based on other thermally driven refrigeration devices (for example, double effect absorption chiller) for cooling and dehumidification of ambient air. The reason is that the regeneration of desiccant material still has been done by utilizing the high temperature heat sources such as boiler, and the apparatus is still operated at temperatures less than 100° C., in which one unit of high quality energy (excergy) of fuel is converted into less than one unit.

SUMMARY OF THE INVENTION

According to the first embodiment of the invention, a desiccant assisted air conditioning apparatus comprises: a process air passage for flowing process air for dehumidification through a desiccant and for delivery to a conditioning space; and a regeneration air passage for flowing regeneration air for removing moisture from the desiccant; and an absorption heat pump means for providing cooling means for process air and heating means for the regeneration air; the absorption heat pump means comprising: a first circulation unit having a fist evaporator, a first absorber, a first generator and a first condenser for providing an absorption refrigeration cycle operating at a first operating pressure; a second circulation unit having a second evaporator, a second absorber, a second generator and a second condenser for providing an absorption refrigeration cycle operating at a second operating pressure lower than the first operating pressure; and a heat exchanger between the first evaporator in the first circulation unit and the second absorber in the second circulation unit between the first evaporator in the first circulation unit and the second absorber in the second circulation unit for performing a heat transfer between the first evaporator and the second absorber; wherein the heat of condensation from the first circulation unit and from the second circulation unit together with the heat of absorption from the first circulation unit are utilized as heating means for regenerating the desiccant, and the heat of evaporation in the second circulation unit is utilized as cooling means for cooling the process air prior to delivery to the conditioning space.

According to the first aspect of the air conditioning apparatus presented above, the heat pump device (including refrigeration devices) is combined with a desiccant assisted air conditioning apparatus to achieve a high level of energy conservation and system performance. A sum of heat corresponding to the external heat input into the system plus the heat of evaporation into the second circulation unit is recovered by utilizing the heat of condensation generated in the first and second circulation units and the heat of absorption generated in the second circulation unit. This sum of heat is used to produce hot water of 60°–80° C. for regeneration of the desiccant material. Furthermore, the heat of evaporation required for the second evaporator in the second circulation unit is supplied by the chilled water to produce chilled water of about 15° C. used as a cooling source for cooling the process air in the air conditioning section of the system. The device configuration presented is not only highly effective in conserving the primary energy required for desiccant regeneration, but the cooling efficiency for the air conditioning apparatus is also improved. The use of all the heat sources enabled by the heat pump device achieves a high level of energy conservation and performance for the desiccant assisted air conditioning apparatus.

According another aspect, desiccant assisted air conditioning apparatus including a process air passage for flowing process air for dehumidification through a desiccant and for delivery to a conditioning space; and a regeneration air passage for flowing regeneration air for removing moisture from said desiccant; and an absorption heat pump means for providing cooling heat source for process air by way of a heating device and heating heat source for said regeneration air by way of cooling cevice; said absorption heat pump means comprising:

a lower pressure evaporator, and a higher pressure evaporator operating at a higher operating pressure than said lower pressure evaporator; a lower pressure absorber, and a higher pressure absorber operating at a higher operating pressure than said lower pressure absorber; a generator; a condenser; and heat exchanging means for providing heat to said higher pressure evaporator by transferring the heat of absorption from said lower pressure absorber to said higher pressure evaporator; wherein a refrigerant evaporated in said lower pressure evaporator is absorbed in said lower pressure absorber, and a refrigerant evaporated in said higher pressure evaporator is absorbed in said higher pressure absorber, and said heating device is communicated with a heating passage for heat exchange with said higher pressure absorber and said condenser, and said cooling device is provided with a cooling passage for heat exchange with said lower pressure evaporator.

According to the second aspect, the same level of energy conservation as in the first embodiment is obtained through the recovery of a sum of heat, i.e. overall heat input into the system plus the heat of evaporation in the lower pressure evaporator in the second circulation unit, in the form of the heat of condensation in the first and second circulation units and the heat of absorption in the high pressure absorber in the second circulation unit. This sum of heat is used to produce hot water in the high range of 80°–100° C. for desiccant regeneration. As in the first embodiment, the heat of evaporation required by the low pressure evaporator is utilized so that chilled water of about 10° C. is produced for use in cooling the process air in the air conditioning section of the system. The configuration of the heat pump device in this embodiment offers an advantage that the solution concentration can be adjusted according to the pressure selected so as to produce hot water of higher temperatures and chilled water of lower temperatures. A solution of higher concentration in the lower pressure absorber is achieved, and consequently the absorption temperature is raised and the operating temperature of the high pressure evaporator is also raised, resulting that the absorption temperature in the high pressure absorber is elevated. The overall result is that further degree of energy conservation can be achieved for the same amount of heat input into the desiccant assisted air conditioning apparatus so that a higher temperature can be generated in the hot water.

Therefore, it is evident that the desiccant assisted air conditioning apparatus of the present invention, the consumption of heating energy to drive the overall system is significantly reduced, compared with the conventional air conditioning apparatuss based on double effect absorption chiller, and consistently higher values of the coefficient of performance are obtained.

DESCRIPTION OF THE PREFERRED EMBODIMENTS

Figure 1:
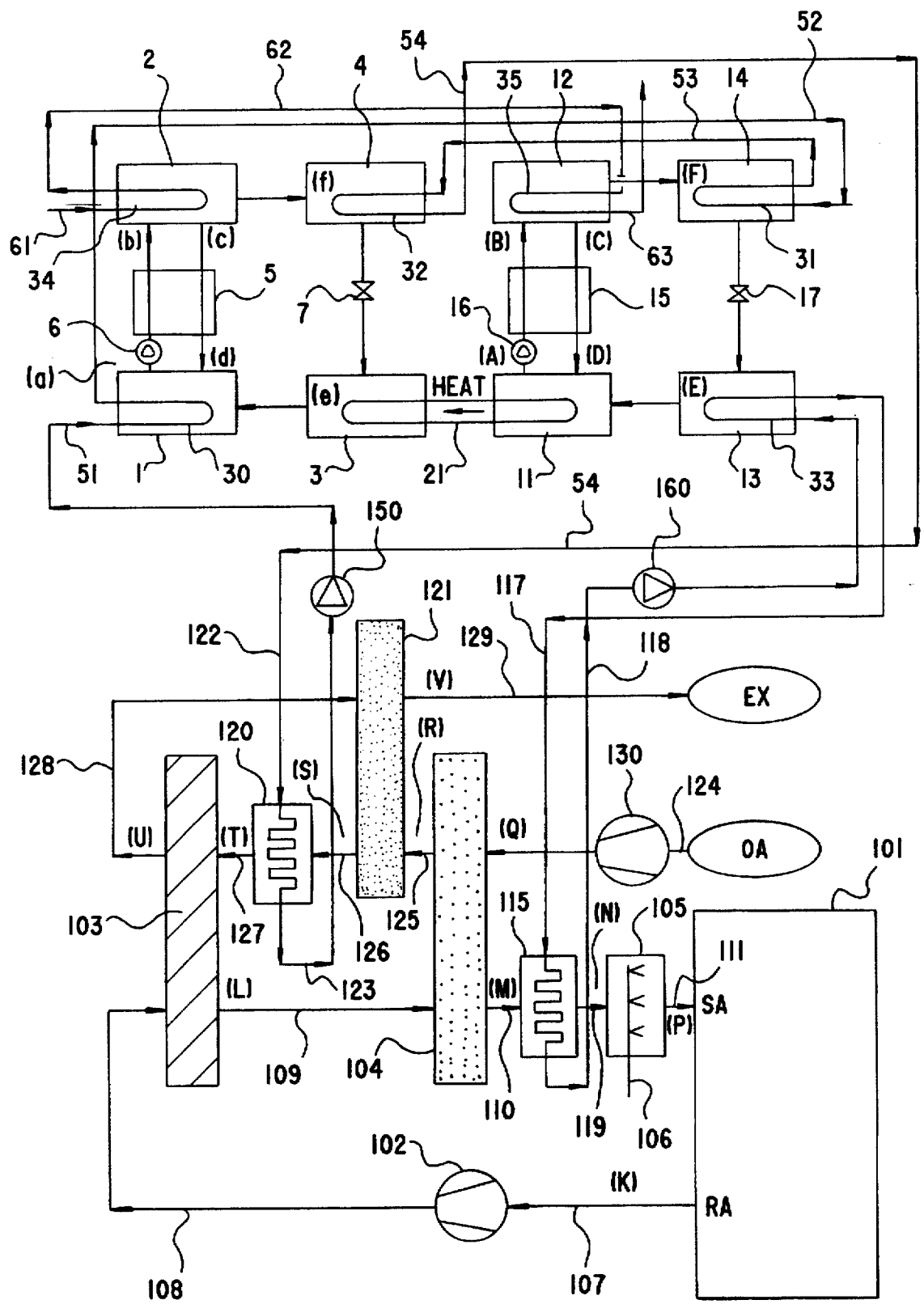
FIG. 1 is a schematic representation of a first embodiment of the desiccant assisted air conditioning apparatus of the present invention combining the heat pump device section and the air conditioning section utilizing the desiccant.
Figure 2:
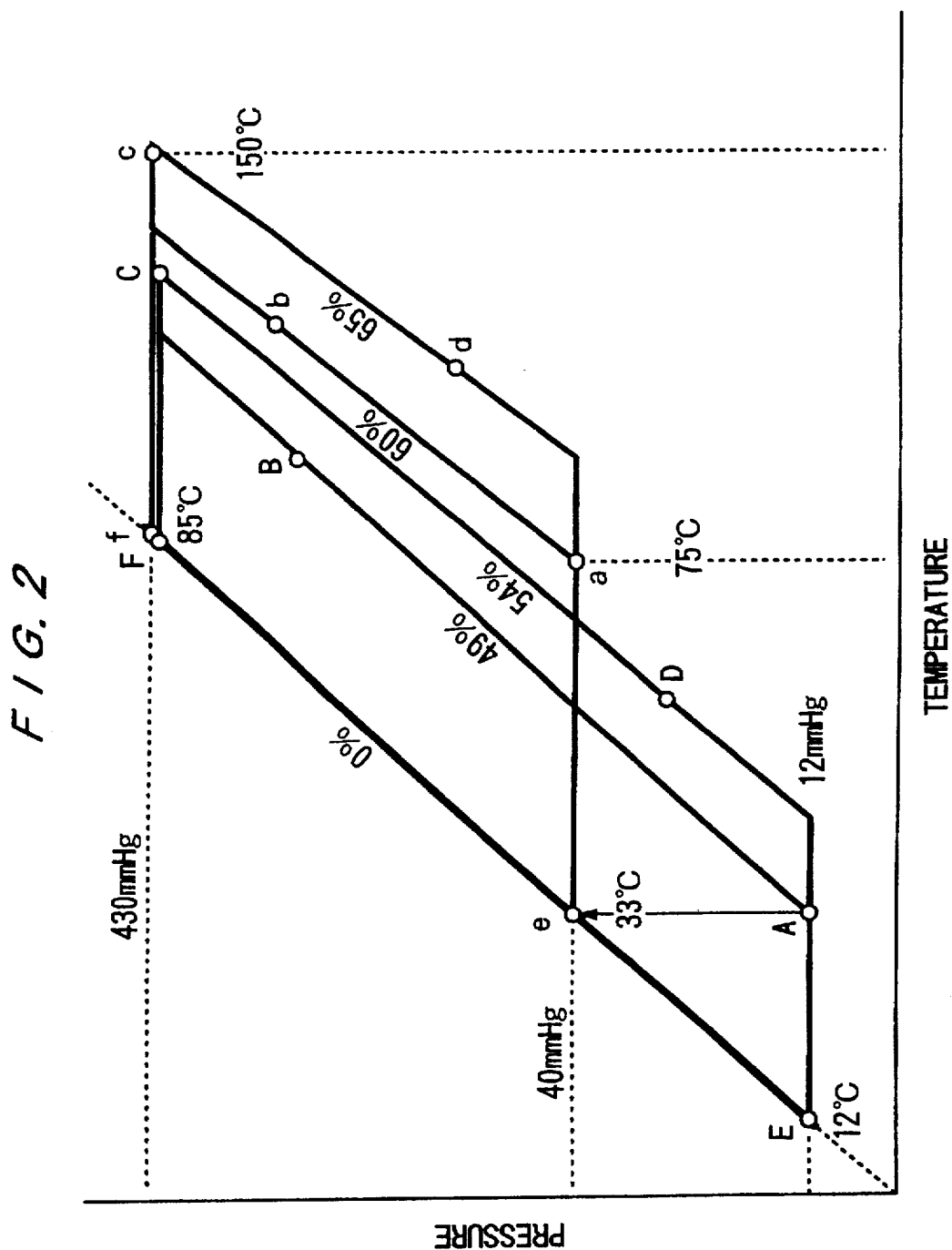
FIG. 2 is a Duhring's diagram showing the operational cycles of the heat pump device of the first embodiment.

A first embodiment of the preferred embodiment will be explained below with reference to FIGS. 1 to 3. FIG. 1 is a schematic representation of the basic configuration of the desiccant assisted air conditioning apparatus of the present invention. The heat pump device section of the apparatus comprises a first circulation unit to provide an absorption refrigeration cycle including a first evaporator 3; a first absorber 1; a first generator 2; a first condenser 4; and a heat exchanger 5 between the solution passages to and from the first absorber 1 and the first generator 2, and a second circulation unit including a second evaporator 13; a second absorber 11; a second generator 12; a second condenser 14; a heat exchanger 15 between the solution passages to and from the second absorber 11 and the second generator 12. The second absorber 11 of the second circulation unit is operated at a lower pressure than the first absorber 1 of the first circulation unit. A heat exchanger 21 in the form of a heat transfer pipe is provided between the first evaporator 3 in the first circulation unit and the second absorber 11 in the second circulation unit. A heat transfer passages 51, 52, 53 and 54 for flowing heat transfer medium such as hot water or chilled water to extracting the heat of condensation generated in the first and second circulation units and the heat of absorption generated in the first circulation unit for use as a heat source for the air condining section of the apparatus. Heat transfer meadium performs heat exchange by being flown through the passages 51, 52, 53 and 54 from the heat transfer pipe 30 of the first absorber 1 to the heat transfer pipe 31 of the second condenser 14, and then to the heat transfer pipe 32 of the first condenser 4. FIG. 1 shows that the hot water pipe and the chilled water pipe, i.e., heat tranfer passages 51, 52, 53 and 54 of the absorption heat pump device are connected to a desiccant assisted air conditioning apparatus respectively through a hot water pump 150 and a chilled water pump 160.

The air conditioning section of the desiccant assisted air conditioning apparatus shown in FIG. 1 is constructed as follows: the conditioning space 101 is communicated with the intake of the blower 102 through the passage 107; the outlet of the blower 102 is communicated with the desiccant wheel 103 through the passage 108; the discharge for the process air from the desiccant wheel 103 is communicated with the sensible heat exchanger 104 for the regeneration air through the passage 109; the outlet for the process air from the heat exchanger 104 is communicated with the chilled water heat exchanger 115 through the passage 110; the outlet for the process air from the chilled water heat exchanger 115 is communicated with the humidifier 105 through the passage 119; and the outlet for the process air from the humidifier 105 is communicated with the conditioning space 101 through the passage 111; thereby completing a processing cycle for the process air.

In the meanwhile, the processing route for the regeneration air is as follows: outside air is introduced by connecting the intake of the blower 130 through the passage 124; the outlet of the blower 130 is communicated with the sensible heat exchanger 104 heat-exchangeable with the process air; the outlet for the regeneration air from the sensible heat exchanger 104 is communicated with the inlet of the low temperature side of another heat exchanger 121 through a passage 125; the outlet of the low temperature side of the sensible heat exchanger 121 is communicated with the hot water heat exchanger 120 through the passage 126; the outlet for the regeneration air of the hot water heat exchanger 120 is communicated with the inlet of the regeneration air from the desiccant wheel 103 through the passage 127; the outlet for the regeneration air of the desiccant wheel 103 is connected to the inlet of the high temperature side of the sensible heat exchanger 121 through the passage 128; the outlet of the high temperature side of the sensible heat exchanger 121 is communicated with the external space through the passage 129 so that outside air can be introduced for use as regeneration air. The hot water inlet of the hot water heat exchanger 120 is communicated with the outlet of the absorber 1 of the first circulation unit in the hot water passage of the absorption heat pump through the passage 122. The hot water outlet of the hot water heat exchanger 120 is communicated with the inlet of the condenser 14 in the second circulation unit in the hot water passage of the absorption heat pump through the passage 123 and the hot water pump 150. The chilled water inlet of the chilled water heat exchanger 115 is communicated with the outlet of the evaporator 13 in the second circulation unit in the chilled water passage of the absorption heat pump through the passage 117, and the chilled water outlet of the chilled water heat exchanger 115 is communicated with the inlet of the evaporator 13 in the second circulation unit in the chilled water passage of the absorption heat pump through the passage 118 and the pump 160. In FIG. 1, the circled alphabetical designations K–V refer to the thermodynamic states of the air corresponding to those in FIG. 3, and SA designates supply air, RA designates return air, OA designates outside air and EX designates exhaust air.

The operational cycle of the absorption heat pump device of such a configuration will be explained below. The solution in the first circulation unit is heated in the generator 2 by a heat medium through the heat transfer pipe 34, which was heated by an external heat source (not shown) and supplied through the passage 61, to generate a vapor of the refrigerant, and after becoming concentrated, is delivered to the first absorber 1 through the first heat exchanger 5. In the first absorber 1, the solution absorbs the refrigerant vapor evaporated in the first evaporator 3, and after being diluted, returns to the first generator 2 again through the first heat exchanger 5 by the pumping action of the pump 6. In the first absorber 1, the absorption heat generated during the process is utilized by heat exchange through a teat transfer medium in the heat transfer pipe 30 such as hot water. The vapor of the refrigerant generated in the first generator 2 enters into the first condenser 4 to be condensed. In the first condenser 4, the heat of condensation generated during the process is transferred to a teat transfer medium (hot water) through the heat transfer pipe 32. The condensed refrigerant flows into the first evaporator 3 to be evaporated. In the first evaporator 3, a quantity of heat corresponding to the evaporation heat generated during the process is transferred through the heat transfer pipe 21 from the second absorber 11 in the second circulation unit. In the heat transfer pipe 21 of the first absorber 1, it is permissible to configure the heat transfer pipes so that the refrigerant is evaporated directly in the second evaporator 13 without resorting to a heat tranfer medium, the result produced is the same.

The solution in the second circulation unit is heated in the second generator 12 by the same heating medium as in the first circulation unit and supplied through the passage 62 and the heat transfer pipe 35 to generate a vapor of the refrigerant, becomes concentrated and is delivered to the second absorber 11 through the second heat exchanger 15. In the second absorber 11, the solution absorbs the refrigerant vapor evaporated in the second evaporator 13, and after becoming diluted, returns to the second generator 12 again through the heat exchanger 15 by the pumping action of the pump 16. In the second absorber 11, the absorption heat generated during the process is transferred to the first evaporator 3 through the heat transfer pipe 21. The vapor of the refrigerant generated in the second generator 12 enters into the second condenser 14 to be condensed. The heat of condensation generated in the second condenser 14 is utilized by transferring the heat to the heat transfer medium through the heat transfer pipe 31. Since the heat transfer medium flows from the condenser heat transfer pipe 30 of the second absorber 11, then to the heat transfer pipe 31 of the second condenser 14, then back to the absorption heat transfer pipe 32 of the first condenser 4 in succession, the absorption temperature of the solution in the first circulation unit becomes lower than the condensation temperature of the refrigerant in the first and second circulation units. The condensed refrigerant is delivered to the second evaporator 13 to be evaporated. In the second evaporator 13, the heat of evaporation is transferred to a heat tranfer medium such as chilled water through the heat transfer pipe 33.

The operation of the absorption heat pump section of the desiccant assisted air conditioning will be explained with reference to FIG. 2. FIG. 2 is a Duhring's diagram showing the operational cycle of the absorption heat pump device shown in FIG. 1. This is a typical example of a lithium bromide-water working fluid system commonly used in the absorption chiller. The alphabetical designations shown in this drawing are related to various conditions of the solution or refrigerant, and the corresponding designations are also shown in FIG. 1.

The solution in the first circulation unit is heated in the first generator 2 by an external heater to generate a vapor of the refrigerant, and after becoming concentrated (150° C. in FIG. 2), it flows into the first heat exchanger 5 (state d) to be delivered to the first absorber 1. In the first absorber 1, the solution absorbs the refrigerant evaporated in the evaporator 3, and after becoming diluted (state a), it is heated again in the first heat exchanger 5 (state b) to return to the first generator 2. The vapor of the refrigerant generated in the first generator 2 enters into the first condenser 4 to be condensed (state f). The heat of condensation generated in the first condenser 4 is transferred to the hot water by the heat transfer pipe 32 acting as a heat exchanger.

The condensed refrigerant is forwarded to the first evaporator 3 to be evaporated (state e). In the first evaporator 3, a quantity of heat corresponding to the heat of evaporation is transferred from the second absorber 11 of the second circulation unit through the heat transfer pipe 21 (state A). The solution in the second circulation unit is heated in the second generator 12 by the heat supplied from an external source through the heat transfer pipe 35 to generate a vapor of the refrigerant, and after becoming concentrated (state C), it flows into the second heat exchanger 15 (state D) to be delivered to the second absorber 11. In the second absorber 11, the solution absorbs the refrigerant evaporated in the second evaporator 13 (state E), and after becoming diluted (state A), it is heated again in the second heat exchanger 15 (state B) to return to the second generator 12. In the second absorber 11, the heat of absorption generated during the process is transferred to the first evaporator 3 (state e) in the first circulation unit through the heat transfer pipe 21. The vapor of the refrigerant generated in the second generator 12 enters into the second condenser 14 to be condensed (state F). The condensed refrigerant (state F) is forwarded to the second evaporator 13 to be condensed (state F). The condensed refrigerant is delivered to the second evaporator 13 to be evaporated (state E).

The absorption heat pump of the configuration described above produces a high level of energy conservation, and gives a highly efficient thermal performance by efficient utilization of heat as explained below. The high temperature heat supplied by the external heater to the first generator 2 in the first circulation unit is used for concentrating the refrigerant in the first circulation unit, and the heat possessed by the vapor of the refrigerant generated in the process is recovered in and extracted from the first condenser 4 as the heat of condensation. The concentrated solution absorbs the vapor evaporated in the first evaporator 1 in the first absorber 11, and the heat of absorption is also utilized. As well, the high temperature input heat supplied from external source to the second generator 12 in the second circulation unit is used to concentrate the solution in the second circulation unit, and the heat possessed by the vapor is recovered in and extracted from the second condenser 14 as the heat of condensation to produce hot water of about 60°–80° C. In the second evaporator 13 in the second circulation unit, the heat of evaporation in a form of chilled water of about 15° C. is extracted for cooling. Also, the heat of absorption generated in the second absorber 11 in the second circulation unit is utilized as the heat of evaporation in the first circulation unit. The hot water thus generated in the absorption heat pump device is used for desiccant regeneration, and the chilled water is utilized for cooling the process air.

Overall heat balance of the operational cycle shows that the heat input consists of the high temperature external heat input into the first and second generators 2, 12 in the first and second circulation units and a quantity of heat extracted from the chilled water in the second evaporator 13 in the second circulation unit, whereas, the heat output during the cycle is the absorption heat in the first circulation unit and the condensation heat in the first and second circulation units. In other words, the hot water receives not only the high temperature heat input from the external heater in the first circulation unit but also the heat extracted from the chilled water in the second circulation unit, therefore the amount of heat available for heating is increased beyond the amount of heat supplied externally to the generators 2, 12 in the first and second circulation units. Therefore, it has been demonstrated that a heat pump effect has been achieved in the thermal cycles produced in the present apparatus.

Next, the operation of an air conditioning apparatus combining the absorption heat pump device presented above with desiccant assisted conditioning section will be explained.

Figure 3:
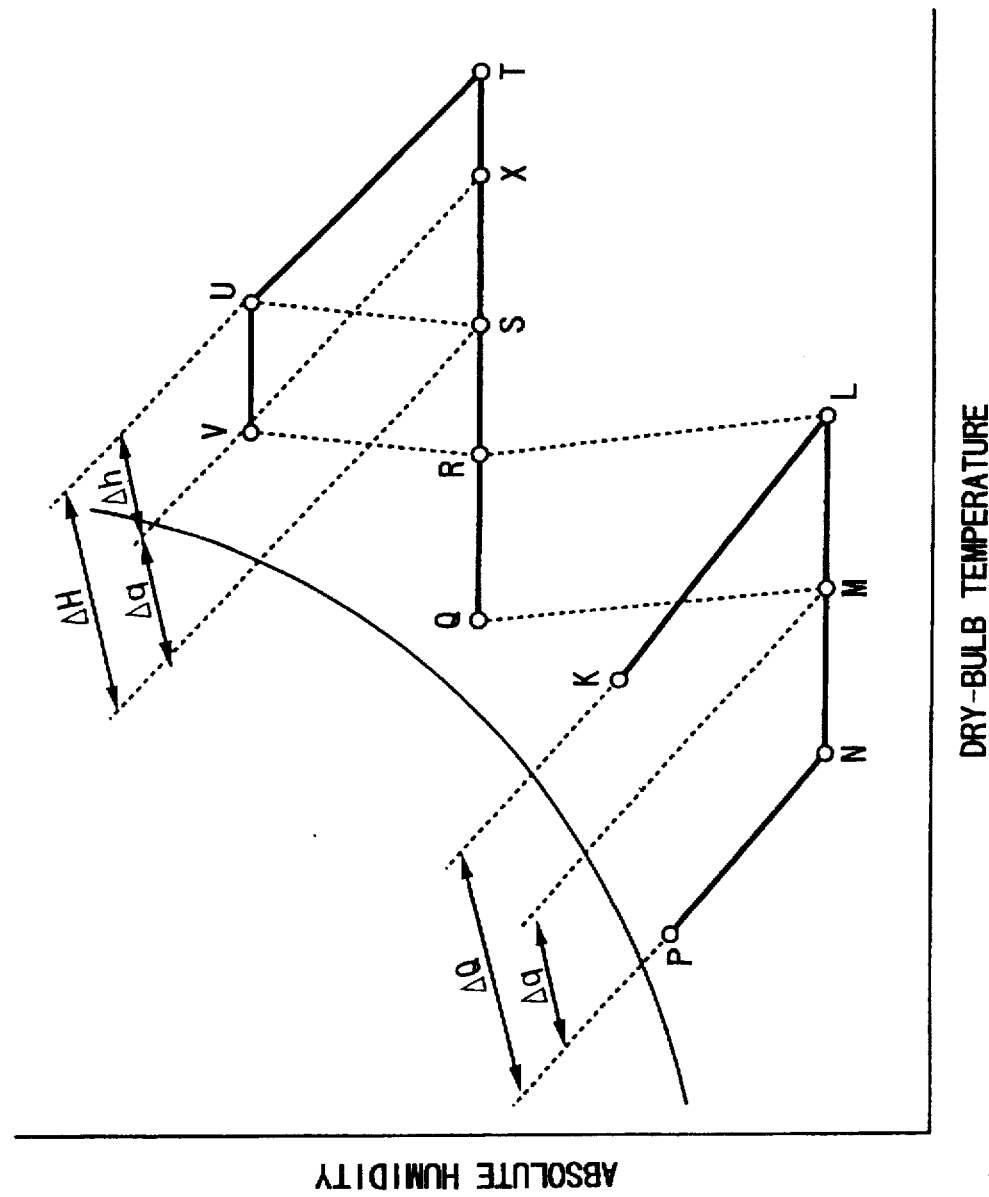
FIG. 3 is a psychrometric chart showing the desiccant assisted air conditioning cycle in the first embodiment.

FIG. 3 is a psychrometric chart showing the operation of the air conditioning section of the apparatus shown in FIG. 1. The operation of the air conditioning apparatus is as follows. Referring to FIG. 1, ambient air (process air) from the conditioning room 101 is withdrawn through the passage 107 into the blower 102 to be pressurized, and the pressurized air is forwarded to the desiccant wheel 103 through the passage 108, wherein the humidity ratio in the process air is lowered by having the moisture in the ambient air removed by the moisture adsorbent in the desiccant wheel 103. Heat released during the adsorption process raises the temperature of the process air. The process air with lower humidity and higher temperature is forwarded to the sensible heat exchanger 104 through the passage 109 and cooled by heat exchange with the outside air (regeneration air). The cooled process air is delivered through the passage 110 to the chilled water heat exchanger 115 for further cooling. The cooled process air is delivered to the humidifier 105 for cooling isenthalpically by water spray or evaporative humidifier, and the cooled process air is returned to the conditioning space 101 through the passage 111.

The desiccant material becomes loaded with moisture in the above process, and it is necessary to be regenerated. In this embodiment, this is performed using the outside air as regeneration air as follows. Outside air (OA) is withdrawn into the blower 130 through the passage 124 to be pressurized, and the pressurized outside air is delivered to the sensible heat exchanger 104 through the passage 124 to cool the process air. The regeneration air, having raised its own temperature, is forwarded to the next sensible heat exchanger 121 through the passage 125 wherein heat exchange takes place with the high temperature spent regeneration air to further raise its own temperature, and the regeneration air exiting the sensible heat exchanger 121 flows into the hot water heat exchanger 120 through the passage 126. At this point the temperature of the regeneration air is raised to 60°–80° C. by the hot water, and its relative humidity is decreased.

This process corresponds to the sensible heat change of the regeneration air, and the specific heat of the regeneration air is extremely low compared with that of hot water, resulting in a large variation in the air temperature. Therefore, even if the flow rate of the hot water is decreased (resulting in variations in temperature of the hot water), heat exchange process can take place quite efficiently. Accordingly, the condensation temperature of the heat pump at the inlet side of the hot water in the second circulation unit can be set lower than the absorption temperature of the first circulation unit at the outlet of the hot water. By adopting such an approach, the pressure and temperature requirements in the generator 2 in the first circulation unit can be lowered, and the heat input load of water into the generator 2 in the first circulation unit can be also lightened. By making the useable temperature difference of the hot water to be large, the flow rate can be decreased, and therefore the transport load of water is also lowered.

The regeneration air exiting from the hot water heat exchanger 120 has a lower relative humidity than before, and in the process of flowing through the desiccant wheel 103 removes the moisture therefrom, thus performing regeneration of the desiccant material. Spent air which has passed through the desiccant wheel 103 flows into the sensible heat exchanger 121 through the passage 128, preheats the outside air and is exhausted through the passage 129 to outside environment.

The process to this point will be explained with reference to psychrometric chart in FIG. 3. The air to be processed for the conditioning space 101 (process air: state K) is withdrawn through the passage 107 into the blower 102 to be pressurized, and the pressurized process air is forwarded to the desiccant wheel 103 through the passage 108. The humidity ratio in the process air is lowered by absorption of moisture in the process air into the moisture adsorbent in the desiccant wheel 103, and its temperature is raised by absorbing the heat of adsorption (state L). The process air, having its humidity lowered and temperature raised, is delivered to the sensible heat exchanger 104 through the passage 109, and undergoes heat exchange with outside air (regeneration air) to lower its temperature (state M). The cooled process air is forwarded to the chilled water heat exchanger 115 through the passage 110 to be further cooled (state N). The cooled process air is delivered to the humidifier 105 through the passage 119 and its temperature is lowered isenthalpically by water spray or evaporative humidifier (state P), and the process air is returned to the conditioning space 101 through the passage 111. During the process described above, an enthalpy difference $\Delta Q$ between the return air (state K) and the supply air (state P) is generated to provide the driving force for cooling the conditioning space 101.

Regeneration process of the desiccant follows the following states. Outside air for regeneration (OA: state Q) is withdrawn into the blower 130 through the passage 124 to be pressurized, and is delivered to the sensible heat exchanger 104 to cool the process air while raising its own temperature (state R), and flows into the next sensible heat exchanger 121 through the passage 125, and, in exchanging heat with the high temperature spent air, raises its own temperature (state S). Regeneration air leaving the heat exchanger 121 flows into the hot water heat exchanger 120 through the passage 126 so that its temperature is raised to 60°–80° C., and its relative humidity is decreased (state T). Regeneration air having lower relative humidity passes through the desiccant wheel 103 to remove the moisture therefrom (state U).

Spent air which has passed through the desiccant wheel 103 flows into the sensible heat exchanger 121 through the passage 128, and preheats regeneration air exiting from the sensible heat exchanger 104, and lowers its own temperature (state V). Spent air is exhausted to outside environment through the passage 129. The process cycles described above, i.e., regeneration of desiccant on the one hand and dehumidification and cooling of process air on the other, is repeatedly carried out to provide desiccant assisted air conditioning of the conditioning space. It is a common practice to utilize exhaust air from the conditioning room as regeneration air, and in this invention also, there is no problem in recycling the exhaust room air for regeneration air, and the same result will be obtained.

The COP value to indicate the energy efficiency of the desiccant regeneration having the present configuration can be calculated by dividing the enthalpy difference $\Delta Q$ in FIG. 3 by the amount of heat input used for regeneration purpose. However, the heat input $\Delta H$ added to regeneration air by the hot water heat exchanger includes that amount of heat $\Delta Q$ supplied by the chilled water heat exchanger which extracts the heat from the process air by means of the absorption heat pump effect through the chilled water heat exchanger 115 and the second evaporator 13 in the second circulation unit. Therefore, the actual amount of heat supplied to the overall system is obtained by subtracting $\Delta q$ from $\Delta H$, which is denoted by $\Delta h$ which corresponds to the sensible heat change generated in going from state X to state T.

It therefore follows that COP is given by the following expression:

$$\Delta Q/(\Delta H - \Delta q) = \Delta Q/\Delta h$$

Figure 9:
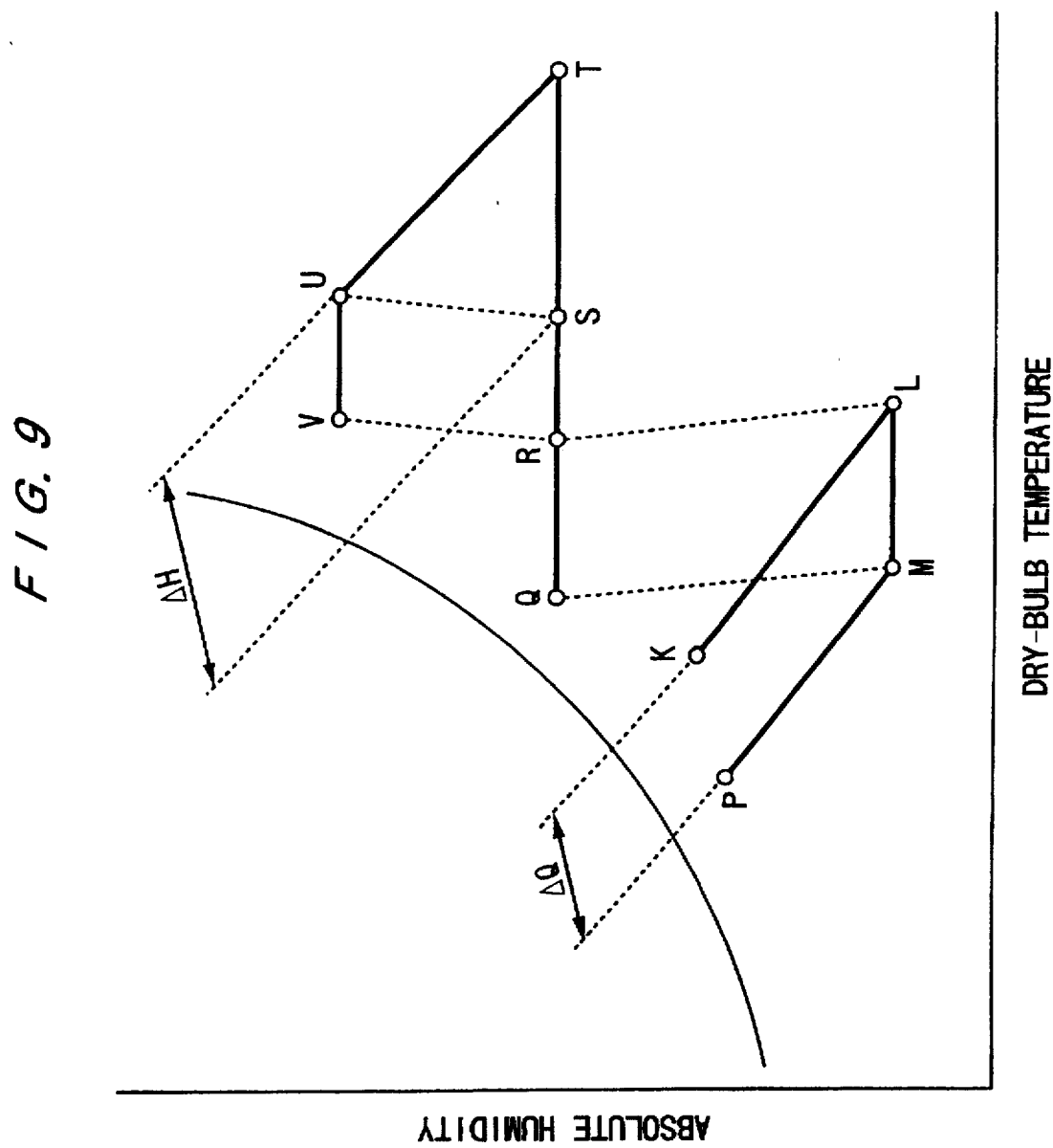
FIG. 9 a psychrometric chart of the conventional desiccant assisted air conditioning apparatus shown in FIG. 8.

Comparing COP in FIG. 3 with the conventional COP in FIG. 9, it can be seen that in the present embodiment the cooling effect denoted by $\Delta Q$ in the numerator is increased by an amount equal to $\Delta q$, and that the heat input indicated by the denominator is lowered by an amount equal to $\Delta q$, thereby leading to a significant increase in the final COP.

Sample calculation of COP for the present apparatus will be outlined below. Assuming that COP for the refrigeration effect of absorption heat pump to be about 0.3, and that COP for the conventional desiccant assisted air conditioning is 1.0, the present COP can be obtained as follows. Letting the heat input from an external heat source into the absorption pump to be 1.0, the heat pump effect adds a heat input of 1.3 to the hot water, and when this heat is used to operate the desiccant assisted air conditioning, heat input for the refrigeration effect is given by:

$$1.0(COP) \times 1.3(\text{input heat}) + 0.3(\Delta q) = 1.6$$

wherein, Δq is refrigeration effect.

Therefore, the present COP is obtained as:

(cooling effect)/(heat input to absorption heat pump)
=1.6/1.0
=1.6

This value is far in excess of COP of 1.2 for the double effect absorption chiller of conventional design, thus indicating the present apparatus is operating at quite a high level of energy conservation.

In summary review, it can be concluded that the overall performance of the air conditioning apparatus is improved by a high level of energy utilization demonstrated in the first embodiment. That is, a sum of heat corresponding to the high temperature external input heat into the generators in the first and second circulation units plus the heat of evaporation in the second circulation unit is utilized as a heating heat source of an intermediate temperature range of 60°–80° C. for desiccant regeneration in a form of the heat of condensation in the first circulation unit and the absorption heat in the second circulation unit. Further, the evaporation heat absorbed in the evaporator in the second circulation unit is utilized as a cooling heat source of approximately 15° C. for cooling the process air in the desiccant assisted air conditioning cycle of the apparatus. The result is energy conservation in desiccant regeneration as well as improved cooling effect.

In the following, a second embodiments of desiccant assisted air conditioning apparatus will be presented with reference to FIGS. 4 to 7.

Figure 4:
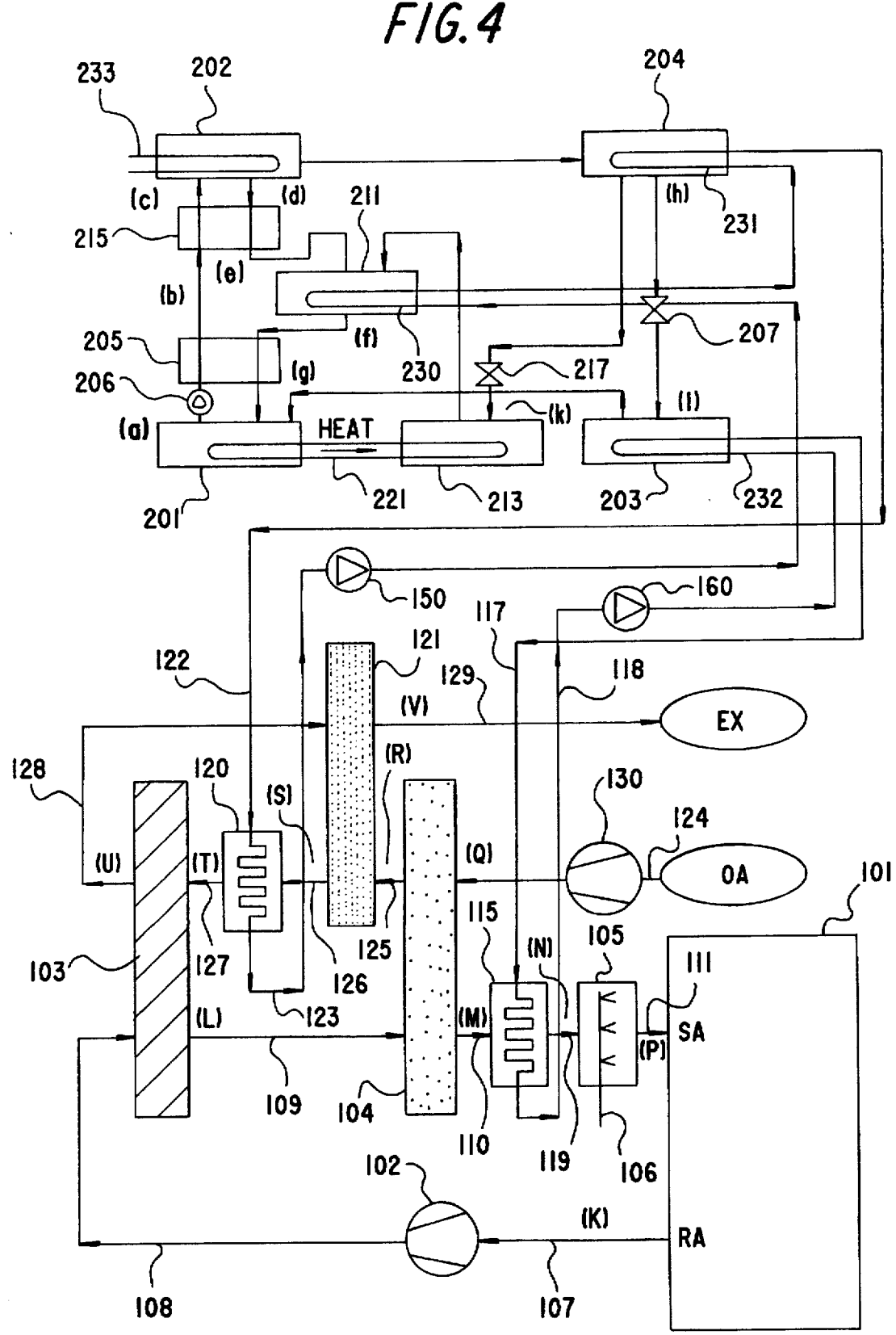
FIG. 4 is a schematic representation of a second embodiment of the desiccant assisted air conditioning apparatus of the present invention.

FIG. 4 is a schematic representation of the basic configuration of a desiccant assisted air conditioning apparatus of the present invention. The absorption heat pump section comprises: a lower pressure evaporator 203; a higher pressure evaporator 213 which operates at a higher pressure than the low pressure evaporator 203; a low pressure absorber 201; a high pressure absorber 211 which operates at a higher pressure than the low pressure absorber 201; a generator 201; a condenser 204; a first heat exchanger 205; and a second heat exchanger 215. The apparatus is configured by including a heat transfer pipe 221 acting as a heat exchanger for heat transfer between the low pressure absorber 201 and the high pressure evaporator 213 so that the heat of absorption generated in the low pressure absorber 201 is used to heat the high pressure evaporator 213, and the refrigerant evaporated in the low pressure evaporator 203 is absorbed by the low pressure absorber 201, and the refrigerant evaporated in the high pressure evaporator 213 is absorbed in the high pressure absorber 211.

The solution passage for the absorption heat pump device is as follows. The solution exiting the low pressure absorber 201 flows into the generator 202 through the first heat exchanger 205 and the second heat exchanger 215, and further flows into the high pressure absorber 211 through the second heat exchanger 215 to return to the low pressure absorber 201 through the first heat exchanger 205.

The refrigerant passage for the absorption heat pump device is as follows. The refrigerant vapor generated in the generator 202 enters into the condenser 204, and the condensed refrigerant exiting the condenser 204 splits into two paths. The refrigerant in one path flows into the low pressure evaporator 203 through a constricting device 207 and is evaporated in the low pressure evaporator 203, and the evaporated vapor flows into the low pressure absorber 201 to be absorbed into the solution flow. The refrigerant in the other path flows into the high pressure evaporator 213 through the constricting device 217, and after being evaporated in the high pressure evaporator 213, enters into the high pressure absorber 211 to be absorbed into the solution flow.

The heat transfer medium passage for flowing heat transfer medium (hot water) for extracting the absorption heat from the high pressure absorber and the heat of condensation from the condenser as heating source is arranged so that hot water flows from the absorption heat transfer pipe 230 to the condensation heat transfer pipe 231 in this order to provide heat exchange, and the heat transfer medium passage for flowing heat transfer medium (chilled water) for supplying the heat of evaporation to the low pressure evaporator from the chilled water is connected to the heat transfer pipe 232 of the low pressure evaporator 203. In FIG. 4, the hot water pipe and the chilled water pipe from the absorption heat pump device are connected to the desiccant assisted air conditioning apparatus through the respective hot water pump 150 and chilled water pump 160.

The air conditioning section of the apparatus shown in FIG. 4 is the same as that shown in FIG. 1, and the explanations are omitted. The air conditioning section and the absorption pump device are connected as follows.

The hot water inlet (for heat transfer medium) of the heater 120 is connected to the outlet of the condenser 4 in the hot water passage of the absorption heat pump through the passage 122, the hot water outlet of the heater 120 is connected to the inlet of the high pressure absorber 11 through the water pump 150 in the hot water passage of the absorption heat pump. The chilled water inlet of the chilled water heat exchanger 115 is connected to the outlet of the low pressure evaporator 203 through the passage 117 in the chilled water passage, the chilled water outlet of the chilled water heat exchanger 115 is connected to the inlet of the low pressure evaporator 203 through the passage 118 and the pump 160 in the chilled water passage of the absorption heat pump device. In the drawing, the circled alphabet letters denote thermodynamic conditions of the air at the respective locations, and SA designates supply air, RA designates return air, OA designates outside air and EX designates exhaust air.

The absorption cycle of the absorption heat pump device in the desiccant air conditioning apparatus will be explained below. The solution in the first circulation unit is heated in the generator 202 by a heating medium heated by an external heat source (not shown) through the heat transfer pipe 233, generates a vapor of the refrigerant and becomes more concentrated. The concentrated solution enters the high pressure absorber 211 through the second heat exchanger 215. The solution in the high pressure absorber 211 absorbs the vapor evaporated in the high pressure evaporator to become diluted, and is delivered to the low pressure absorber 201 through the first heat exchanger 205. In the low pressure absorber 201, the solution absorbs the vapor of the refrigerant evaporated in the low pressure evaporator 203, and becomes diluted. The weak solution returns to the generator 202 through the first heat exchanger 205 and the second heat exchanger 215 by the action of the pump 206. In the high pressure absorber 211, the absorption heat generated in the process is utilized as heat source for desiccant regeneration by heat exchange through the heat transfer pipe 230 with heat transfer medium such as hot water.

In the low pressure absorber 201, the heat of absorption generated in the process is used within the internal cycle as heating source for the high pressure evaporator 213 by heat exchange through the heat transfer pipe 221. The vapor of the refrigerant generated in the generator 202 enters into the condenser 204 to be condensed. In the condenser 204, the heat of condensation is extracted by heat exchange through the heat transfer pipe 231 with a heat transfer medium such as hot water for regenerating the desiccant material.

The condensed refrigerant in the condenser 204 is split into two paths. In one path, the refrigerant flows into the low pressure evaporator 203 through the constricting device 207, and after extracting the heat in the heat transfer pipe 232 from a heat transfer medium (such as chilled water) and evaporating, flows into the low pressure absorber 201 to be absorbed into the solution flow. In the other path, the refrigerant flows into the high pressure evaporator 213 through the constricting device 217, and after removing the heat from the low pressure absorber 201 through the heat transfer pipe 221 and evaporating, the vapor flows into the high pressure absorber 211 to be absorbed into the solution flow. In this case, in the heat transfer pipe 221 of the low pressure absorber 201, it is permissible to arrange so that evaporation can take place directly in the high pressure evaporator 213 without resorting to a heat transfer medium to achieve the same results.

In this embodiment also, the apparatus is configured so that the condensation temperature of the refrigerant becomes higher than the absorption temperature in the high pressure absorber by flowing the heat transfer medium (hot water) in the direction from the high pressure absorption heat transfer pipe 230 to the condensation heat transfer pipe 231. Therefore, when the apparatus is operated so that the outlet temperature of the hot water is fixed, and the useable temperature difference of the hot water is made large, the operating pressure of the high pressure absorber is lowered, and thereby lowering the evaporation temperature of the high pressure evaporator which leads to lowering in the solution temperature in the low pressure absorber, offering an advantage that the apparatus can be operated at a low overall solution concentration. In the desiccant regeneration arrangement used in the present invention, the sensible heat change is used to heat the regeneration air, therefore a large variation of the useable temperature difference of the hot water is permissible.

On the other hand, if the heat transfer medium (hot water) is made to flow from the condensation heat transfer pipe 231 to the high pressure absorption heat transfer pipe 230, the solution temperature in the high pressure absorber becomes higher than the condensation temperature of the refrigerant. However, in case that there is an upper limit to the pressure rise in the generator 202 and it is desired to have a high outlet temperature of the hot water, the hot water passage of the configuration presented above has an advantage that the pressure in the generator does not increase, because the operating pressure in the high pressure absorber becomes high, causing the evaporation temperature in the high pressure evaporator to rise and the solution temperature in the low pressure absorber also to rise, though the overall solution concentration becomes high in the absorption heat transfer pipe device.

Figure 5:
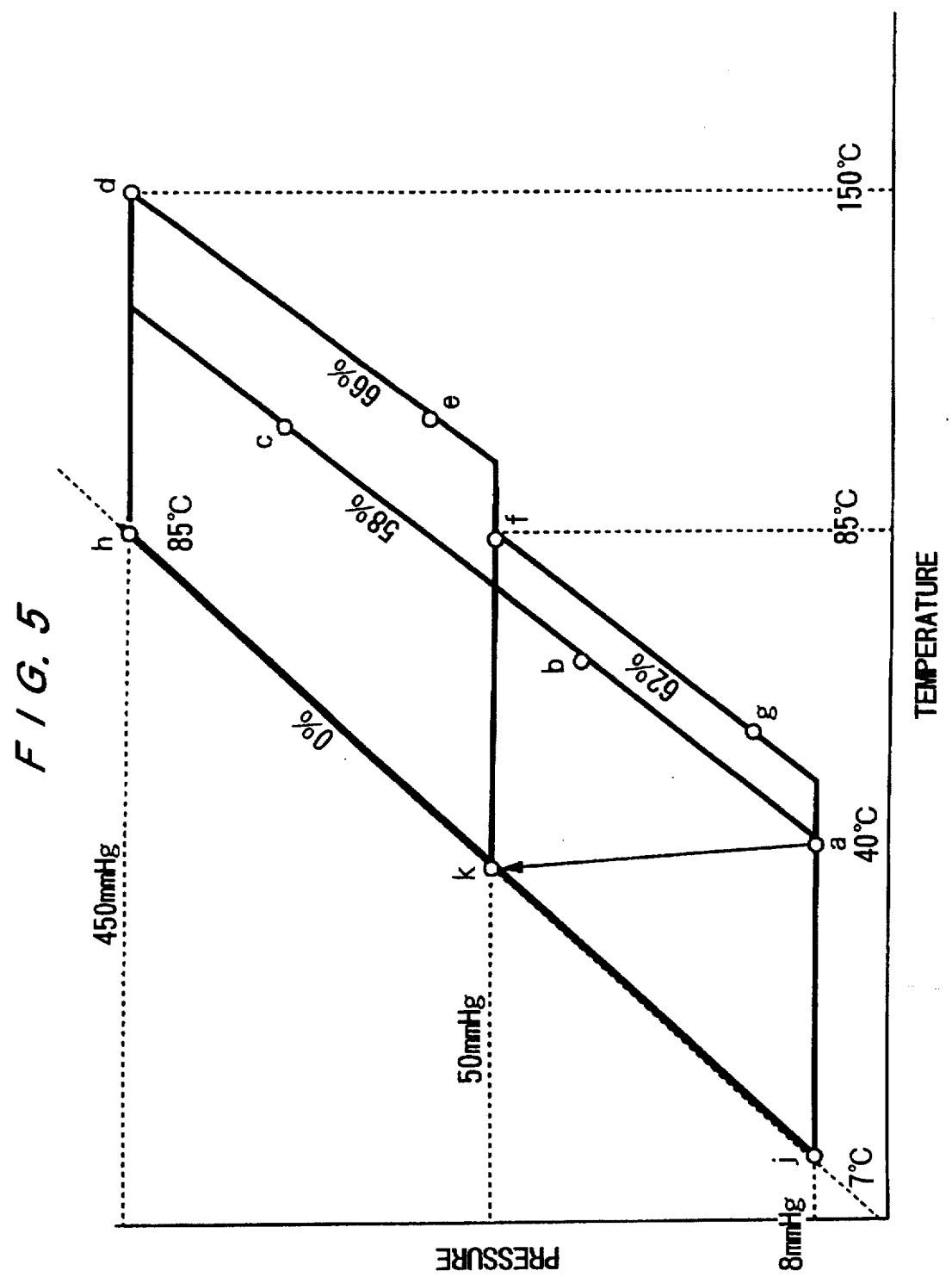
FIG. 5 is a Duhring's diagram showing the operational cycles of the heat pump device of the second embodiment.

The operation of the heat pump section of the desiccant assisted air conditioning apparatus will be explained with reference to FIG. 5. FIG. 5 is a Duhring's diagram showing the operational cycle of the absorption heat pump device. The operating apparatus is based on a typical example of a commonly used lithium bromide-water system. The circled designations refer to the various conditions of the solution and the refrigerant, and the same designations are also given in FIG. 4. The solution is heated in the generator 202 by an external heater, generates a refrigerant vapor, and after becoming concentrated (state d: 150° C. in FIG. 5) reaches the high pressure absorber 211 (state e) through the second heat exchanger 215. In the high pressure absorber 211, the solution absorbs the evaporated refrigerant in the high pressure evaporator 213, and after becoming diluted (state f), the solution is cooled (state g) by passing through the first heat exchanger 205, and flows into the low pressure absorber 201 to absorb the refrigerant evaporated in the low pressure evaporator 203. And after becoming diluted (state a), the solution is heated by flowing into the first heat exchanger 205 (state b) and then to the second heat exchanger 215 (state c) and returns to the generator 202. The vapor of the refrigerant generated in the generator 202 enters into the condenser 204 and is condensed (state h). The condensed refrigerant splits into two paths. The refrigerant in one path flows into the low pressure evaporator 203 through the constricting device 207, and after extracting the heat through the heat transfer pipe 232 (from the heat transfer medium such as chilled water) and evaporating (state j), the refrigerant flows into the low pressure absorber 201 and is absorbed into the solution flow. The refrigerant in the other path flows into the high pressure evaporator 213 through the constricting device 217, and after removing the heat of absorption from the low pressure absorber 201 and evaporating (state k), flows into the high pressure absorber 211 and is absorbed into the solution flow. The absorption heat (state a) generated in the low pressure absorber 201 is transported to the high pressure evaporator 213 to evaporate the refrigerant.

The heat pump device of the configuration presented above produces the following heat utilization effects. The high temperature heat externally supplied to the generator 202 is used to concentrate the solution, and the heat possessed by the vapor generated in the process is removed as condensation heat from the condenser 204, and the concentrated solution absorbs the refrigerant evaporated in the high pressure evaporator 213, and the absorption heat generated in the process is removed from the high pressure absorber 211 in a form of hot water in a range of 80°–100° C. In the low pressure evaporator 203, the heat of evaporation is supplied from the chilled water acting as a heating source to produce chilled water of about 10° C. The heat of absorption generated in the low pressure absorber 201 is utilized within the apparatus as evaporation heat for the high pressure evaporator 213.

It is seen that the hot water produced in the heat pump device is utilized for desiccant regeneration, and the chilled water is utilized for cooling the process air. The heat balance in the overall apparatus indicates that the heat input into the cycle is a sum of the high temperature external heat supplied from an outside source and the heat extracted from the chilled water in the low pressure evaporator 203, and the heat output from the cycle is a heat inputted into the hot water, which is a sum of the heat of absorption removed from the high pressure absorber 211 and the heat of condensation removed from the condenser 204. Therefore, hot water receives heat removed from the chilled water in the low pressure evaporator 203 in addition to the high temperature external heat, and the total heat supplied is higher than the heat supplied to the generator from the outside source. Therefore, the cycle of the apparatus provides a heat pump effect as demonstrated.

The operational behavior of the desiccant assisted air conditioning apparatus having the heat pump device of the above configuration is the same as that in the first embodiment shown in FIG. 1, and can be explained with the use of a psychrometric chart shown in FIG. 3, so the explanations will be omitted.

The coefficient of performance (COP) of this embodiment is given by a value obtained by cooling effect ΔQ in FIG. 3 by the regeneration heat input. As shown by an example related to FIG. 1, it is given by 1.6 (cooling effect)/1.0 (heat input into the absorption heat pump device)=1.6. This value is much higher than a value of 1.2 which is typical of conventional double effect asorption chiller, and shows the high degree of energy conservation.

As demonstrated above, the heat of absorption generated in the high pressure absorber and the heat of condensation generated in the condenser, either in a heat pump device or in a refrigerator, can be used as heat source for desiccant regeneration purposes, and the heat of evaporation required in the low pressure evaporator can be used as a cooling source to produce chilled water for cooling the process air in the air conditioning purposes.

Figure 6:
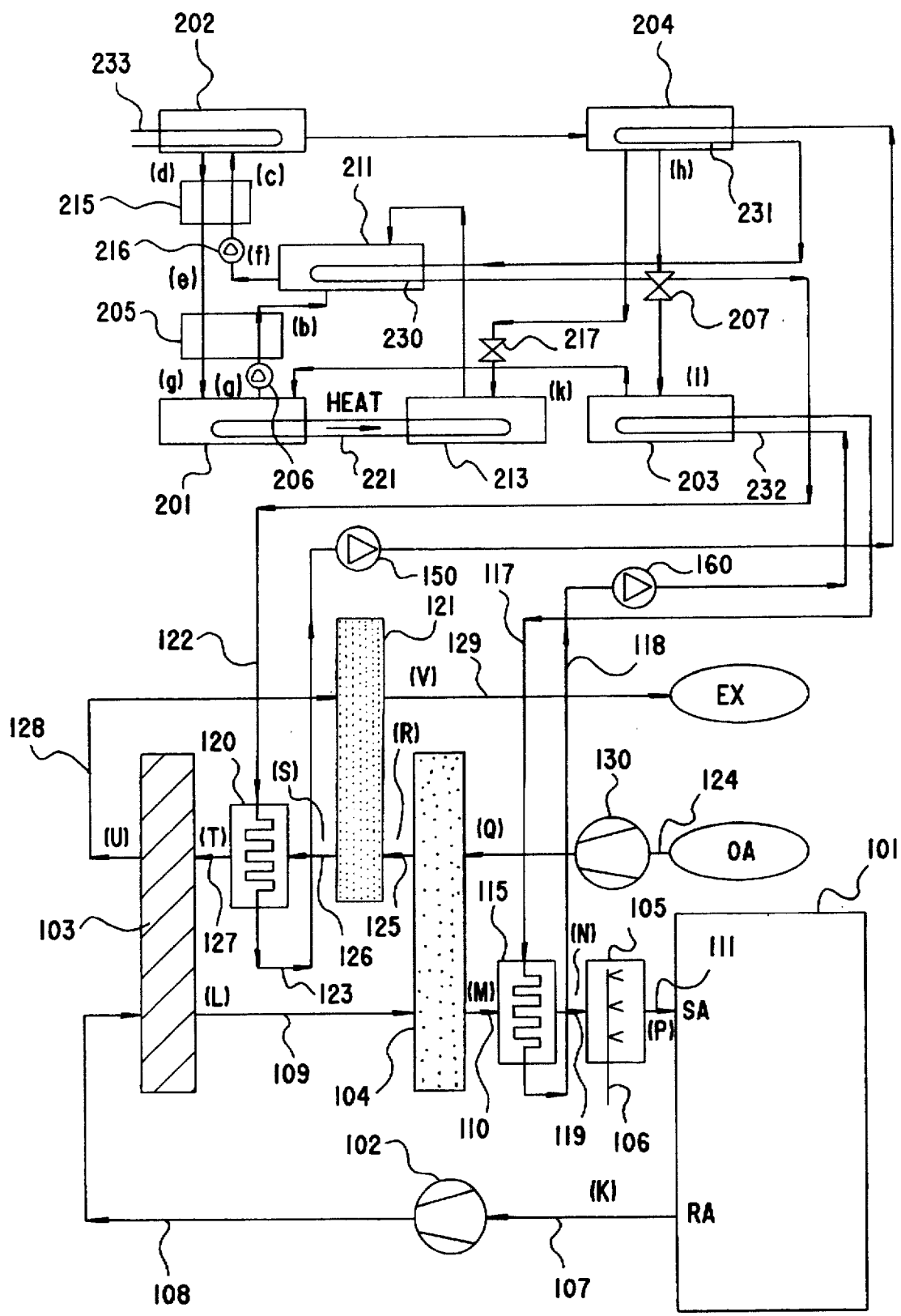
FIG. 6 is schematic representation of a third embodiment of the desiccant assisted air conditioning apparatus of the present invention.

FIG. 6 is a schematic representation of the basic configuration of a third embodiment of the present invention. The absorption heat pump section comprises the following components: a lower pressure evaporator 203; a higher pressure evaporator 213 which operates at a higher pressure than the low pressure evaporator 203; a low pressure absorber 201; a high pressure absorber 211 which operates at a higher pressure than the low pressure absorber 201; a generator 201; a condenser 204; a first heat exchanger 205; and a second heat exchanger 215. The apparatus is configured so that, on the one hand, the high pressure evaporator 213 is heated by the heat of absorption generated in the low pressure absorber 201 by having a heat transfer pipe 221 acting as a heat exchanger device for the low pressure absorber 201 and the high pressure evaporator 213, and that the refrigerant generated in the low pressure evaporator 203 is absorbed by the low pressure absorber 201 and that the vapor evaporated in the high pressure evaporator 213 is absorbed by the high pressure absorber 211.

The solution passage for the absorption heat pump device is as follows. The solution exiting the low pressure absorber 201 flows into the high pressure absorber 211 through the first heat exchanger 205. The solution exiting the high pressure absorber 211 flows into the generator 202 through the second heat exchanger 215, and the solution exiting the generator 202 returns to the low pressure absorber 201 through the second heat exchanger 215 and first heat exchanger 205. The refrigerant passage for the absorption heat pump device is as follows. The vapor of the refrigerant generated in the generator 202 enters into the condenser 204, and the condensed medium exiting the condenser 204 splits into two paths. The refrigerant in one path flows into the low pressure evaporator 203 through a constricting device 207 and evaporate in the low pressure evaporator 203, and then flows into the low pressure absorber 201 to be absorbed into the solution flow. The refrigerant in the other path flows into the high pressure evaporator 213 through the constricting device 217, and the evaporated refrigerant from the high pressure evaporator 213 enters into the high pressure absorber 211 to be absorbed into the solution flow. The hot water passage of the heat transfer medium (hot water) for removing the absorption heat from the high pressure absorber and the condensation heat from the condenser for use as heating source is constructed so that heat exchange is performed by successively flowing from the condenser heat transfer pipe 231, then to the absorption heat transfer pipe 230 of the high pressure absorber 230. The chilled water passage of the heat transfer medium (chilled water) for supplying the evaporation heat to the low pressure evaporator for use as cooling source is constructed by connecting to heat transfer pipe 232. In FIG. 6, the hot water passage and the chilled water passage of the heat pump device are connected to the desiccant assisted air conditioning apparatus through a hot water pump 150 and a chilled water pump 160 respectively.

The air conditioning section of the desiccant assisted air conditioning apparatus shown in FIG. 6 is the same as the shown in FIG. 1 or FIG. 4, and the explanations will be omitted. The air conditioning section and the absorption heat pump are connected as follows.

The inlet for the heat transfer medium (hot water) for the heater 120 is connected to the outlet of the high pressure absorber 211 in the hot water passage of the absorption heat pump through the passage 122, and the hot water outlet of the heater 120 is connected to the inlet of the high pressure condenser 204 in the hot water passage of the absorption heat pump through the passage 123 and the water pump 150. The chilled water inlet of the chilled water heat exchanger 115 is connected to the outlet of the low pressure evaporator 203 through the passage 117 in the chilled water passage, and the chilled water outlet of the chilled water heat exchanger 115 is connected to the inlet of the low pressure evaporator 203 in the chilled water passage of the absorption heat pump device through the passage 118 and the pump 160. In the drawing, the circled alphabet letters denote various thermodynamic conditions of the process air corresponding to FIG. 4, and SA designates supply air, RA designates return air, OA designates outside air and EX designates exhaust air.

The operational cycle of the absorption heat pump device in the desiccant air conditioning apparatus will be explained below. The solution is heated by an external source of heat (not shown) in the generator 202 through the heat transfer pipe 233, generates a refrigerant vapor and becomes concentrated. The concentrated solution enters the high pressure absorber 211 through the second heat exchanger 215 and the first heat exchanger 205. In the low pressure absorber 201, the solution absorbs the refrigerant evaporated in the low pressure evaporator 203, and after becoming diluted, the solution is pumped by the pump 206 to reach the high pressure absorber 211 through the first heat exchanger 205. In the high pressure absorber 211, the solution absorbs the vapor evaporated in the high pressure evaporator 213 to become diluted, and is returned by the pump 216 to the generator 202 through the second heat exchanger 215. In the high pressure absorber 211, the absorption heat generated in the process is utilized as heat source for desiccant regeneration by heat exchange through the heat transfer pipe 230 with heat transfer medium such as hot water.

The heat of absorption generated in the low pressure absorber 201 is used within the internal cycle for heating the high pressure evaporator 213 by heat exchange through the heat transfer pipe 221. The vapor of the refrigerant generated in the generator 202 enters into the condenser 204 to be condensed. In the condenser 204, the heat of condensation is used to regenerate the desiccant material by removing the heat through heat exchange process in the heat transfer pipe 231 with a heat transfer medium such as hot water. The condensed refrigerant in the condenser 204 is split into two paths. In one path, the refrigerant flows into the low pressure evaporator 203 through the constricting device 207, and after utilizing the heat in the heat transfer pipe 232 from a heat transfer medium (such as chilled water) and evaporating, flows into the low pressure absorber 201 to be absorbed into the solution flow. In the other path, the refrigerant flows into the high pressure evaporator 213 through the constricting device 217, and after removing heat from the low pressure absorber 201 (in the heat transfer pipe 221) and evaporating, flows into the high pressure absorber 211 to be absorbed into the solution flow.

Figure 7:
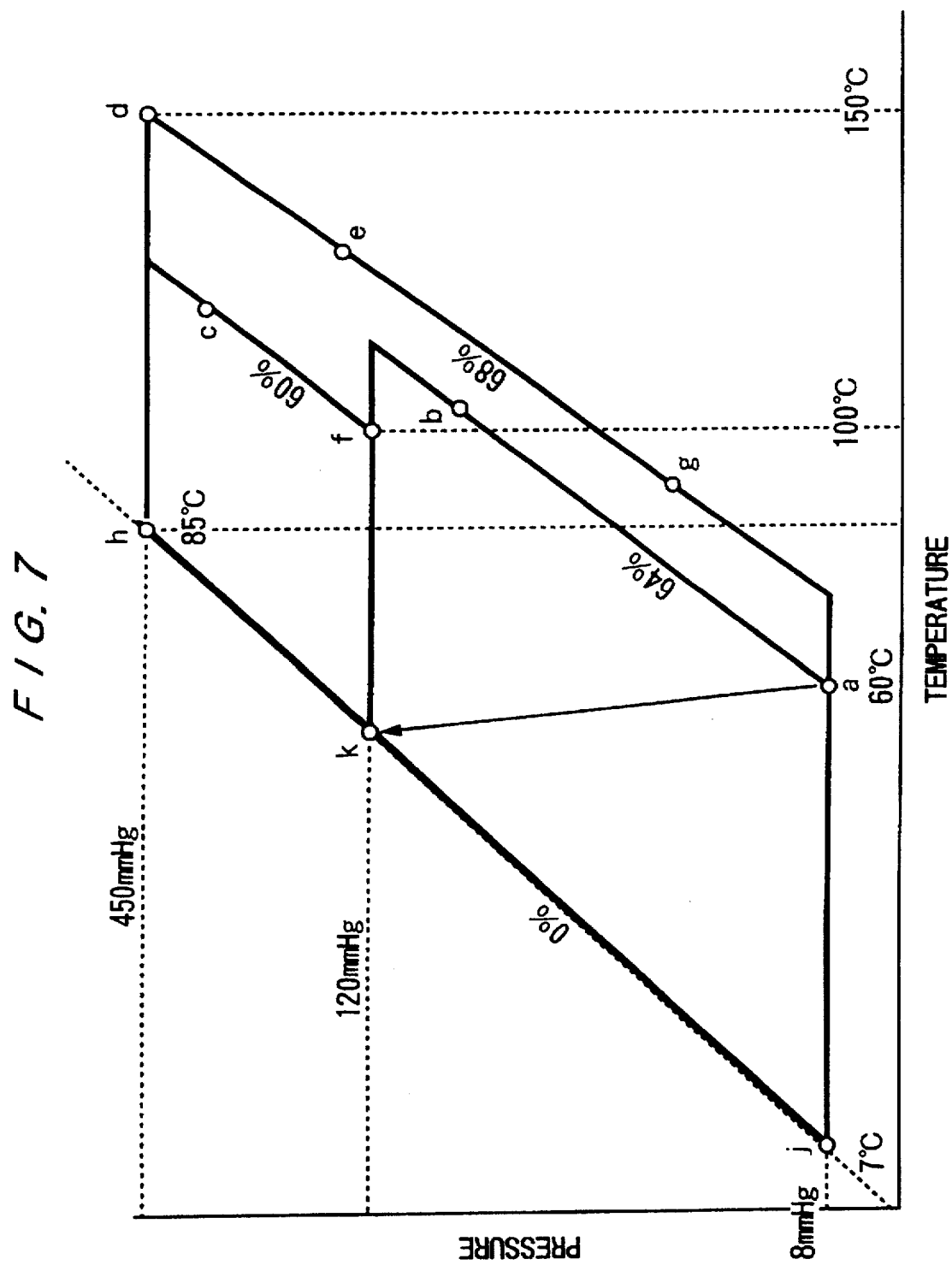
FIG. 7 is a Duhring's diagram showing the operational cycles of the heat pump device of the third embodiment.
Figure 8:
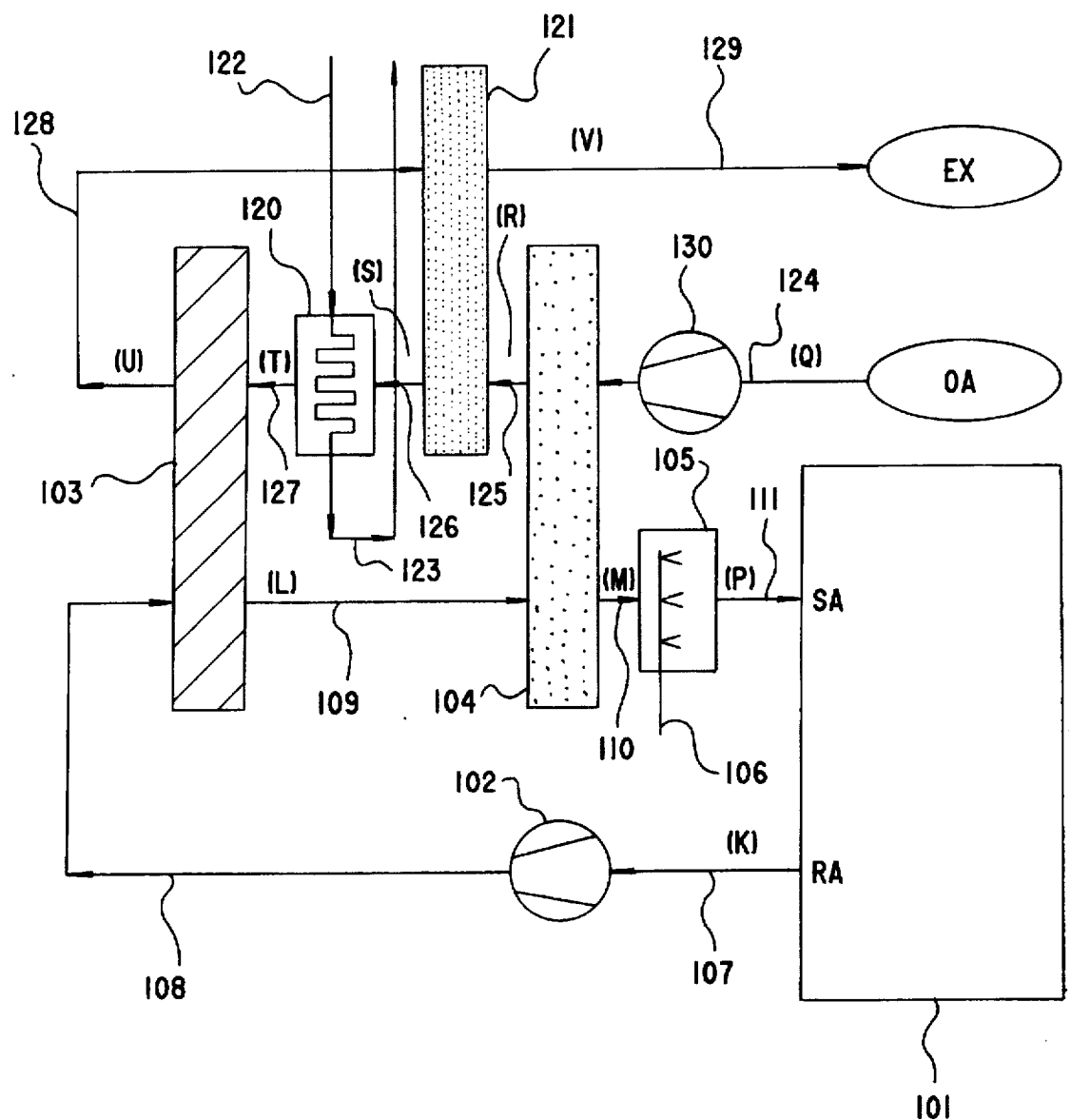
FIG. 8 is a schematic representation of a conventional desiccant assisted air conditioning apparatus.

The operation of the heat pump section of the desiccant assisted air conditioning apparatus will be explained with reference to FIG. 7. FIG. 7 is a Duhring's diagram showing the absorption heat pump operational cycle of the apparatus shown in FIG. 6. This operating system is also based on a typical example of a commonly used lithium bromide-water working fluid system. The circled designations refer to the conditions of the solution and the refrigerant, and the same designations are also given.

The solution is heated in the generator 202 by an external heater, generates a vapor, and after becoming concentrated (state d: 150° C. in FIG. 7) the solution reaches the low pressure absorber 201 through the second heat exchanger 215 (state e) and the first heat exchanger 205 (state g). In the low pressure absorber 201, the solution absorbs the refrigerant evaporated in the low pressure evaporator 201, and after becoming diluted (state a), the solution flows into the first heat exchanger 205 (state b), to reach the high pressure absorber 211. In the high pressure absorber 211, the solution absorbs the vapor evaporated in the high pressure evaporator 213, and after becoming diluted (state f), is delivered to the second heat exchanger 215 to be heated (state c), and then the solution returns to the generator 202. The vapor of the refrigerant generated in the generator 202 enters into the condenser 204 and is condensed (state h). The condensed refrigerant splits into two paths. The refrigerant in one path flows into the low pressure evaporator 203 through the constricting device 207, and after utilizing the heat from the heat transfer medium (such as chilled water) through the heat transfer pipe 232 and evaporating (state j), the refrigerant flows into the low pressure absorber 201 and is absorbed into the solution flow. The refrigerant in the other path flows into the high pressure evaporator 213 through the constricting device 217, and after removing the heat of absorption from the low pressure absorber 201 through the heat transfer pipe 221 and evaporating (state k) flows into the high pressure absorber 211 for absorption into the solution flow. The absorption heat (state a) generated in the low pressure absorber 201 is transferred to the high pressure evaporator 213 to evaporate the refrigerant.

Compared with the absorption heat pump device shown in FIG. 4, the heat pump of the present embodiment produces a solution of higher concentration in the low pressure absorber, and consequently the absorption temperature is raised and the operating temperature of the high pressure evaporator is also raised, resulting that the absorption temperature in the high pressure absorber is elevated. The overall result is that a higher temperature can be achieved in the hot water.

In the heat pump device of the present embodiment also, the heat input into the operational cycle consists of the external high temperature heat input into the generator 2 and the heat extracted from the chilled water in the low pressure evaporator 203, and the output heat consists of the heat of absorption generated in the high pressure absorber 211 and the heat of condensation generated in the condenser 4, therefore, the hot water receives not only the external heat input but also the heat recovered from the chilled water, and the total available amount of heat for heating is larger than the external heat alone. Therefore, the cycle of the apparatus provides a heat pump effect as demonstrated.

The operational behavior of the air conditioning apparatus incorporating the absorption heat pump device and the effect on energy conservation are the same as those explained with reference to FIG. 4, and can be explained similarly using the psychrometric chart shown in FIG. 3.

In the present embodiment also, the heat of absorption generated in the high pressure absorber and the heat of condensation generated in the condenser, which can be either a heat pump device or a refrigerator, are used as heat source in the desiccant regeneration process, and the heat of evaporation in the low pressure evaporator is utilized in producing the chilled water used in cooling the process air in the air conditioning process.

Although the foregoing embodiments were illustrated in terms of understanding, and should not be construed to limit the scope of the present invention.

What is claimed is:

1. A desiccant assisted air conditioning apparatus including a process air passage for flowing process air for dehumidification through a desiccant and for delivery to a conditioning space; and a regeneration air passage for flowing regeneration air for removing moisture from said desiccant; and an absorption heat pump means for providing cooling heat source for process air and heating source for said regeneration air, said absorption heat pump means comprising:

a first circulation unit having a first evaporator, a first absorber, a first generator and a first condenser for providing an absorption refrigeration cycle operating at a first operating pressure;

a second circulation unit having a second evaporator, a second absorber, a second generator and a second condenser for providing an absorption refrigeration cycle operating at a second operating pressure lower than said first operating pressure;

a heat exchanger provided between said first evaporator in said first circulation unit and said second absorber in said second circulation unit for performing a heat transfer between said first evaporator and said second absorber;

a first heat medium passage means for introducing external heat for providing generation heat for said absorption heat pump means in which heat transfer medium flows in the order from said first generator to said second generator, a second heat medium passage means for extracting heat of condensation in said first and second circulation unit and heat of absorption in said first circulation unit which passes through said condenser of said first and second circulation unit and said absorber in said first circulation unit in series, and a third heat medium passage means for extracting heat of evaporation in said second circulation unit, wherein the heat of condensation from said first circulation unit and from said second circulation unit together with the heat of absorption from said first circulation unit are utilized as heating heat source for regenerating said desiccant, and the heat of evaporation in said second circulation unit is utilized as cooling heat source for cooling said process air prior to delivery to said conditioning space.

2. A desiccant assisted air conditioning apparatus as claimed in claim 1, wherein a sensible heat exchanger is provided between said process air passage and said regeneration air passage for providing heat transfer between pre-desiccant regeneration air and post-desiccant process air.

3. A desiccant assisted air conditioning apparatus as claimed in claim 2, wherein a heating medium passage is communicated with a heating device disposed at a regeneration air inlet into said desiccant for heating said pre-desiccant regeneration air, and a cooling medium passage is communicated with a cooling device disposed in a process air passage connecting said sensible heat exchanger and said conditioning space for cooling said post-desiccant process air.

4. A desiccant assisted air conditioning apparatus as claimed in claim 1, wherein said desiccant is a desiccant wheel alternatingly communicating with said process air passage or said regeneration air passage.

5. A desiccant assisted air conditioning apparatus including a process air passage for flowing process air for dehumidification through a desiccant and for delivery to a conditioning space; and a regeneration air passage for flowing regeneration air for removing moisture from said desiccant; and an absorption heat pump means for providing cooling heat source for process air by way of a heating device and heating heat source for said regeneration air by way of cooling device; said absorption heat pump means comprising:

a lower pressure evaporator, and a higher pressure evaporator operating at a higher operating pressure than said lower pressure evaporator; a lower pressure absorber, and a higher pressure absorber operating at a higher operating pressure than said lower pressure absorber, a generator; a condenser; and heat exchanging means for providing heat to said higher pressure evaporator by transferring the heat of absorption from said lower pressure absorber to said higher pressure evaporator; wherein a refrigerant condensed in said condenser is branched off into said lower pressure evaporator and said higher pressure evaporator, a refrigerant evaporated in said lower pressure evaporator is absorbed in said lower pressure absorber, and a refrigerant evaporated in said higher pressure evaporator is absorbed in said higher pressure absorber, and said heating device is communicated with a heating passage for heat exchanger with said higher pressure absorber and said condenser, and said cooling device is provided with a cooling passage for heat exchange with said lower pressure a evaporator.

6. A desiccant assisted air conditioning apparatus as claimed in claim 5, wherein a sensible heat exchanger is provided between said process air passage and said regeneration air passage for providing heat transfer between pre-desiccant regeneration air and post-desiccant process air.

7. A desiccant assisted air conditioning apparatus as claimed in claim 6, wherein a heating medium passage is communicated with a heating device disposed at a regeneration air inlet into said desiccant for heating said pre-desiccant regeneration air, and a cooling medium passage is communicated with a cooling device disposed in a process air passage connecting said sensible heat exchanger and said conditioning space for cooling said post-desiccant process air.

8. A desiccant assisted air conditioning apparatus as claimed in claim 5, wherein said desiccant is a desiccant wheel alternatingly communicating with said process air passage or said regeneration air passage.

9. A desiccant assisted air conditioning apparatus as claimed in claim 1, wherein said absorption heat pump is operable without using a cooling device to discard heat to ambient air.

10. A desiccant assisted air conditioning apparatus as claimed in claim 5, wherein said absorption heat pump is operable without using a cooling device to discard heat to ambient air.

11. A desiccant assisted air conditioning apparatus as claimed in claim 1, wherein said absorption heat pump is operable with a temperature difference of more than 10° C. between condensation temperature and absorption temperature.

12. A desiccant assisted air conditioning apparatus as claimed in claim 5, wherein said absorption heat pump is operable with a temperature difference of more than 10° C. between condensation temperature and absorption temperature.

\* \* \* \* \*